United States Patent Office 3,383,324
Patented May 14, 1968

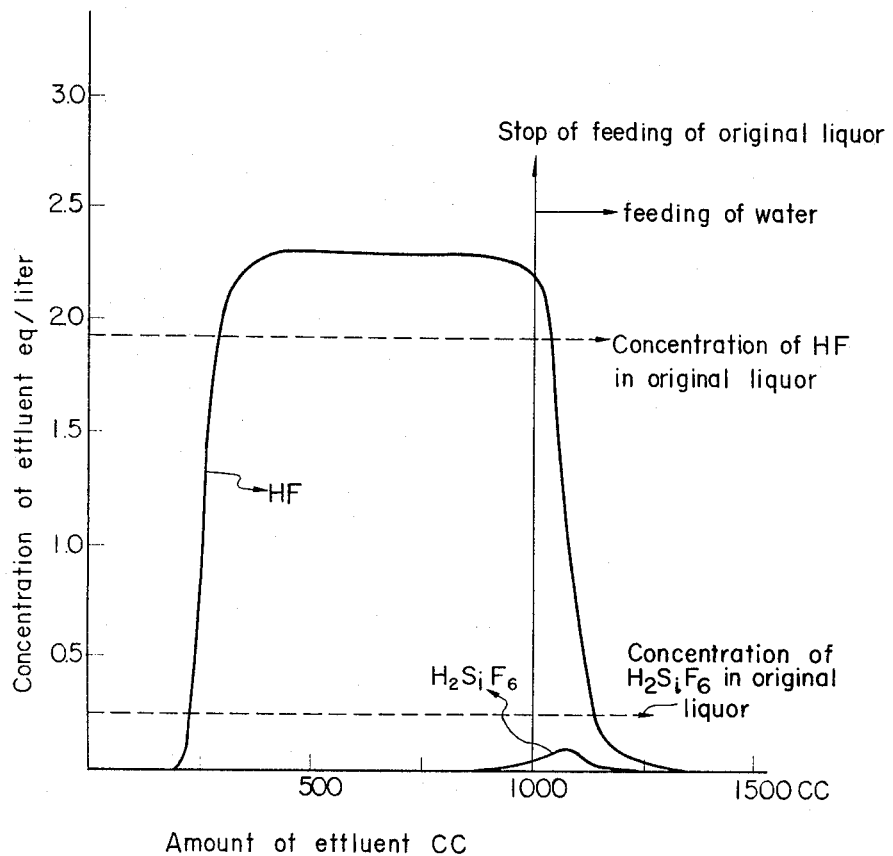

3,383,324
PROCESS FOR RECOVERING ACID VALUES FROM MIXED WASTE ACID USED FOR PICKLING
Yukinori Hiwatashi, Kawaguchi, Japan, assignor to Yawata Iron & Steel Co., Ltd., Tokyo, Japan
Filed Sept. 20, 1965, Ser. No. 488,471
5 Claims. (Cl. 252—142)

ABSTRACT OF THE DISCLOSURE

This invention relates to a method of treating a waste acid solution resulting from pickling silicon steel sheets with a mixed aqueous solution containing sulfuric acid, ferrous sulfate, hydrofluoric acid and fluosilicic acid, which comprises the steps of (1) distilling the said waste acid solution to evaporate hydrofluoric acid, water, and fluosilicic acid contained in the solution, (2) collecting the resulting distillate of hydrofluoric acid, water and fluosilicic acid by means of cooling, (3) filtrating the nonvolatile residual liquor remaining after said evaporation process to obtain a filter cake consisting predominantly of crystals of ferrous sulfate and a mother liquid mainly composed of sulfuric acid and (4) passing the distillate collected in step (2) above containing hydrofluoric acid and fluosilicic acid through an OH-type anion exchange resin to separate hydrofluoric acid solution from said distillate by causing fluosilicic acid to combine with said resin.

---

The present invention relates to a process to recover sulfuric and hydrofluoric acids from mixed waste acid used for pickling silicon steel sheets and, in particular, to a process to recover sulfuric and hydrofluoric acids of such a quality as may be reused for pickling, by the technical combination of distillation and ion exchange. In general, the pickling treatment is carried out to remove scale in the process of producing silicon steel sheets, especially by rolling, and for this purpose, a mixed solution of sulfuric and hydrofluoric acids is usually employed. Also, in the case of normal and stainless steels etc., hydrofluoric acid is sometimes added to sulfuric acid to improve the pickling effects. During the process of pickling, iron and other constituents of steel material dissolve into the acid solution and combine with the acid, resulting in a gradual reduction of the effective amount of free acid in the pickling solution. Consequently, the effects of pickling are reduced, after a certain amount of steel material has been treated, and the waste pickling solution has to be discarded and replaced with a new one. In the case of treating silicon steel sheets, a considerable amount of iron and fluosilicic acid other than sulfuric and hydrofluoric acids is involved in the waste acid. The waste acid of such a composition shows a strong acidity owing to the remaining free sulfuric and hydrofluoric acids. Further, as it contains a large quantity of ferrous ion, when it is discharged into a public water area, the ferrous ion is oxidized into ferric ion, consuming oxygen in the water and changing the color of the water into red. Therefore, it is not allowed to discharge the waste acid into a public water area. Several attempts have heretofore been tried to recover such acids. For example, a method was proposed, in which sulfuric acid might be recovered from waste acid by segregating ferrous sulfate crystal from residual concentrated fluid after distillation as in the case of treating the waste sulfuric acid obtained from pickling normal steel sheets, and further also a method by which hydrofluoric acid might be recovered by condensing distillate and reused for pickling. However, this proposal has still practical problems to be solved because no technical investigation has been made on the formation of fluosilicic acid, peculiarly in the case of pickling silicon steel sheets. In the case of silicon steel sheets, hydrofluoric acid contained in the pickling solution reacts upon silicon compounds, whereby a considerable amount thereof is transformed into fluosilicic acid. Such a chemical reaction is an important reason why hydrofluoric acid is added to the pickling fluid. Fluosilicic acid produced during pickling process has a higher vapor pressure than sulfuric acid. Therefore, when the waste acid is subjected to a distillation, and the concentration of sulfuric acid in the waste acid is thereby raised, fluosilicic acid evaporates and is collected together with hydrofluoric acid and water by condensation. If such a mixed solution of hydrofluoric and fluosilicic acids is reused for pickling silicon steel sheets, fluosilicic acid gradually increases and accumulates in the pickling liquor, which is not only harmful to pickling effects, but also brings about a trouble that fluosilicic acid is decomposed in a condenser or a still vessel, when the concentration thereof becomes higher in the process of distillation, resulting in a formation of $SiO_2$, which will adhere to the walls of said apparatus and makes the distillation operation impossible. Due to difficulties as above mentioned, the method of the said proposal of recovering hydrofluoric acid and reusing it for pickling has not yet been practically realized on an industrial scale. On the other hand, the recovery of sulfuric acid is not economical without a profit of recovering hydrofluoric acid, though it is technically practicable to recover sulfuric acid only by the crystalline separation of iron sulfate by evaporative concentration. Under such conditions, most of the silicon steel sheets works adopt an imperfect treating method of waste pickling acid, in which a residual free acid is neutralized with such expensive materials such as lime and the like and is stored in a large settling basin.

The primary object of the present invention is to establish a technically perfect and economically profitable method of recovering sulfuric acid and hydrofluoric acid from a waste pickling acid resulting from pickling silicon steel sheets, and separating iron as ferrous sulfate.

Another object of this invention is to recover substantially pure hydrofluoric acid solution, which is reuseable for pickling silicon steel sheets, by collecting the most part of hydrofluoric acid contained in the waste acid together with water and fluosilicic acid in the process of evaporative concentration, and subjecting the aqueous solution of hydrofluoric and fluorosilicic acids to an anion exchange treatment to separate fluorosilicic acid by combining the same with resin. A still further object of this invention is to segregate ferrous sulfate as crystal, while raising the concentration of sulfuric acid in the residual fluid when treating the waste acid under evaporative concentration, and at the same time to recover the most part of fluorine ion, which is combined with iron ion, as hydrofluoric acid by distillation and to recover sulfuric acid containing a small amount of ferrous sulfate from residual fluid by separating crystals by means of a suitable filter such as centrifugal separator. The thus recovered hydrofluoric acid solution and sulfuric acid may be used for preparing a solution for pickling silicon steel sheets by adding undiluted hydrofluoric and sulfuric acids thereto.

The details of the objects of the present invention and matters related thereto will be apparent from the following description with reference to the attached drawings.

FIG. 3 is a graph showing the relation between the amount of effluent and composition of effluent when an aqueous solution of hydrofluoric acid fluosilicic acids is passed through a column filled with a weakly basic anion exchange resin, indicating a state of separation of hydrofluoric acid and fluosilicic acid.

Figure 1:
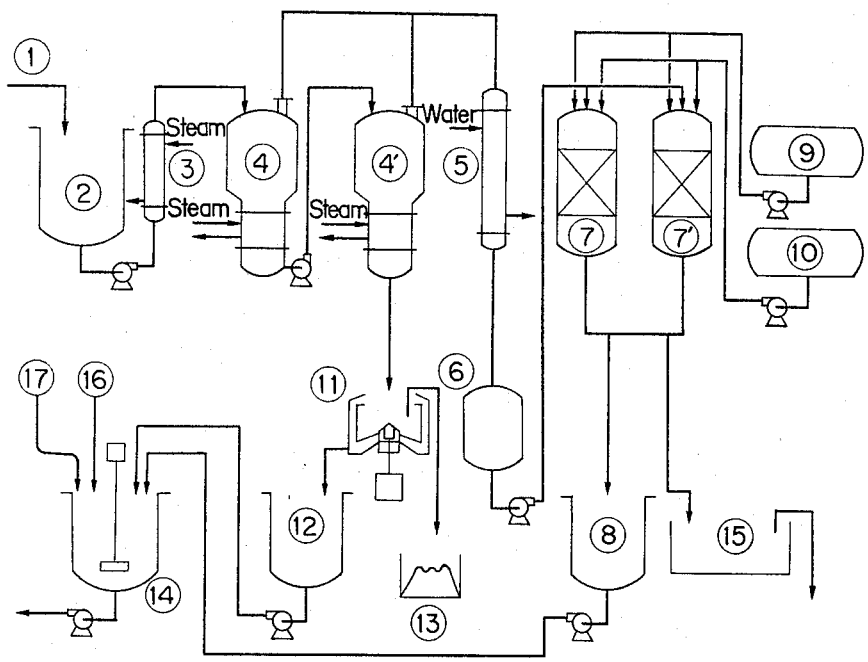
FIG. 1 is a flow sheet of indicating a process of the present invention.

FIG. 1 is an example of a flow-sheet of the process of practically treating the waste acid of the present invention. The subject matter of the present invention shall be explained with reference to FIG. 1. Waste acid fed from a pickling apparatus is stored in a tank 2 from the line 1. The waste acid is then successively and quantitatively pumped to an evaporator 4 through a preheater 3 and heated indirectly by means of steam under a normal pressure, whereby water, hydrofluoric acid and fluosilicic acid evaporate from the waste acid and are condensed in a condenser 5 to obtain a condensed liquid, which is further stored in a tank 6. A part of the components of the waste acid successively fed to the first evaporator 4 evaporates as a vapor, while an increment of solution remaining in the evaporator due to a residual solution is transferred to the second evaporator 4' by pumping to be further evaporated. The distillate from the second evaporator 4' is also condensed in the condenser 5 and then stored in the tank 6, like the distillate from the first evaporator 4. The concentration of sulfuric acid in the solution in the first evaporator 4 can be properly adjusted according to the evaporation speed, but should not be raised too high, because otherwise the amount of ferrous sulfate to be crystallized out will be too large, which will bring difficulty in transferring a slurry containing ferrous sulfate.

In the case of the second evaporator 4' it is desirable to maintain the concentration of sulfuric acid in the solution within the evaporator at above 60% in order to vaporize hydrofluoric acid and fluosilicic acid contained in the waste acid as perfectly as possible. However, as almost all parts of ferrous sulfate contained in the waste acid are depositesd in the form of crystal and the solution in the evaporator assumes a slurry-like-state, when the concentration of sulfuric acid is maintained as high as above mentioned, it is necessary to choose design and materials for evaporator and heater so as to meet the above mentioned conditions. The fluid in the second evaporator 4' is successively drawn out therefrom to keep the residual fluid in the evaporator constant, and then is fed to a centrifugal separator 11, in which the fluid is separated to ferrous sulfate crystal and sulfuric acid solution as a mother liquor fluid, which are stored in tanks 12 and 13, respectively.

The above mentioned process of evaporative concentration of waste pickling acid and separation of ferrous sulfate from the concentrated waste acid is not peculiar to the present invention, but is per se known in the art. The distillation may be carried out in a batch system or in a continuous system, which is, however, not limited to a two-tank flow system as adopted by the present invention. Further, in the present invention may be adopted a known distillation process, in which the concentration of hydrofluoric acid in the solution containing hydrofluoric acid to be recovered is raised after a considerable amount of water has been separated from a waste pickling acid so as not contain any hydrofluoric acid therein by carrying out the distillation under low pressure as is known in the art. As to the concentration of sulfuric acid in a fluid within a evaporator it is desirable from the economic point of view to maintain the same in the range of 45 to 50% in view of balancing calorie consumption required for evaporative concentration with amounts of sulfuric acid and hydrofluoric acid lost by adherence to crystals of $FeSO_4$ which is to be separated from a mother liquor as mentioned hereinafter, because some residual amounts of iron and fluosilicic acid are permitted when a recovered sulfuric acid is reused for pickling. Further, steam containing hydrofluoric acid and fluosilicic acid evaporated from the waste acid is desirable to be indirectly cooled and condensed by using a water-cooled surface condenser as adopted by the present invention, but may be also converted into an aqueous solution of hydrofluoric acid and fluosilicic acid by directly contacting with cold water.

The continuous stream of the vapor from the evaporators 4 and 4' is cooled and condensed and then stored in the tank 6, as above mentioned. The composition of this distillate varies with the composition of the waste acid and conditions of operation, but it contains substantially three components: hydrofluoric acid, fluosilicic acid and water. This condensed liquid is fed to the normal ion exchange tower 7 filled with anion exchange resin of OH-type by pumping. While the liquid passes through the resin bed, hydrofluoric acid ion and fluosilicic acid ion are combined with the anion exchange resin. When continuing the feeding of the liquid to the said ion exchange tower, the exchange resin becomes saturated with acid radicals and the acid begins to break through. But, at this time, as the bonding strength between fluosilicic acid ion and the anion exchange resin is greater than that between hydrofluoric acid ion and the anion exchange resin, hydrofluoric acid once combined with the anion exchange resin is replaced by fluosilicic acid and consequently an effluent containing substantially only hydrofluoric acid flows out. When further continuing the feeding of the liquid to the tank, the resin becomes saturated with fluosilicic acid ion, and fluosilicic acid flows out therefrom. At this moment, the feeding of the liquid is switched over from the first ion exchange tower 7 to the second ion exchange tower 7'. After this operation is over, an aqueous solution of strong acid such as sulfuric acid or hydrochloric acid is supplied to the first ion exchange tower 7 from the tank 9 to completely replace the fluosilicic acid combined with the resin bed thereby, and thereafter an alkaline solution such as an aqueous solution of caustic soda and the like is supplied to the ion exchange tower from the tank 10 to neutralize the said acid and to convert the resin to the OH-type, which is further cleaned by water to complete the regeneration thereof to be ready for reuse in the next separation of hydrofluoric acid and fluosilicic acid. The waste acid obtained from this regeneration process is sufficiently mixed with the acid and alkaline effluents from the regeneration process, while passing through the vessel 15 and further the pH value of the mixed solution is regulated so as to be able to discharge it as harmless waste water into public water area.

Then, concentrated sulfuric acid 16 for supplementing that part of sulfuric acid consumed or lost and hydrofluoric acid 17 for supplementing that part of hydrofluoric acid consumed or lost are added and mixed to and with the recovered solution of condensed sulfuric acid collected in the tank 12 and the recovered solution of hydrofluoric acid collected in the tank 8 to make a mixture in the mixing vessel 14, which is reused for pickling silicon steel sheets.

Figure 2:
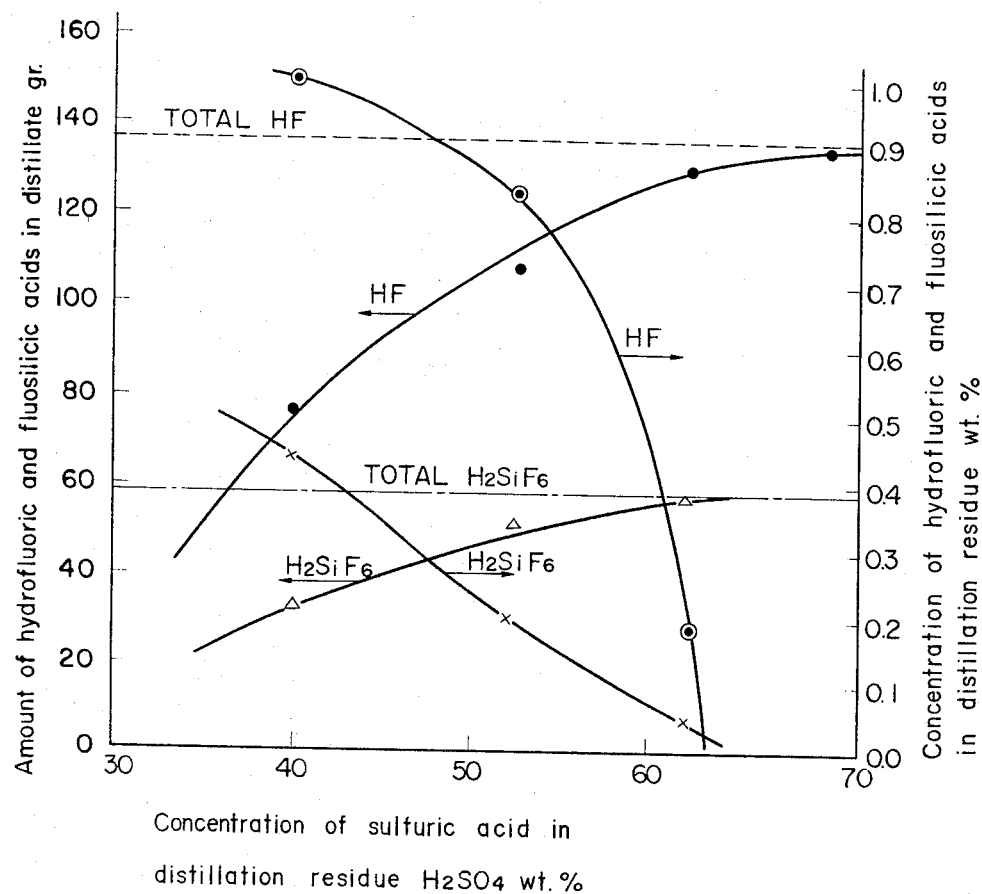
FIG. 2 is a graph showing the relations between the composition of distillation residue in a still and the distillate amounts of hydrofluoric and fluosilicic acids in the process of distillation of the waste pickling solution.

FIG. 2 is a graph showing as one example of the present invention the relation between the concentration of sulfuric acid in the distillation residue and the amount of hydrofluoric acid and fluosilicic acids in the distillate during the process of distillation.

The analysis of the compositions of the waste acid, distillate, residual liquor in still and residual solid in still in the case of evaporating about 60% of the waste acid by subjecting 10.00 kg. of the waste acid to the distillation is as shown in the following table.

| Composition | Waste acid, kg. | Distillate, kg. | Residual liquid in still, kg. | Residual solid in still |
|---|---|---|---|---|
| $FeSO_4$ | 0.729 | 0 | 0.0191 | $FeSO_4 \cdot H_2O$. |
| HF | 0.138 | 0.131 | 0.00695 | 0.795 kg. |
| $H_2SiF_6$ | 0.0585 | 0.058 | 0.00045 | |
| $H_2SO_4$ | 2.33 | 0 | 2.33 | |
| $H_2O$ | 6.74 | 5.24 | 1.42 | |

When carrying out the experiments with various evaporation ratios, the relations between the concentration of sulfuric acid in the residual liquor and the evaporation ratios of hydrofluoric acid and fluosilicic acid were obtained as shown in FIG. 2. As is clearly seen from FIG. 2, a great part of hydrofluoric acid and substantially all of fluosilicic acid evaporate, if the concentration of sulfuric acid exceeds about 60%. On the basis of recognition of the above mentioned facts any technique of evaporative concentration and apparatus therefor may be employed in the process according to the present invention for recovering hydrofluoric acid from waste acid resulting from pickling silicon steel sheets. However, from the economic point of view the concentration of sulfuric acid in the residual liquor is desirable to be maintained in the range of from 45 to 50%, as already mentioned, but from the necessity of recovering hydrofluoric acid and possibly eliminating fluosilicic acid the concentration of sulfuric acid should be more than 60%.

FIG. 3 is a graph showing the state of separating hydrofluoric acid from fluosilicic acid by means of an anion exchange resin. As one example of a condensed liquor recovered from waste acid resulted from pickling silicon steel sheets according to the above mentioned method, an aqueous solution of HF 1.922 eq./l. and $H_2SiF_6$ 0.241 eq./l. was employed. That is, said solution was flowed through a column filled with 100 ml. of a weakly basic anion exchane resin of OH-type, Amberlie 1R-45, with the space velocity 4, that is, a speed of 400 ml./hr. The relation between the amount of effluent and the composition thereof obtained from the above operation is graphed in FIG. 3. When the amount of effluent exceeds 900 cc., a small amount of fluosilicic acid begins to be found mixed in the effluent. Therefore, the feeding of the original liquor was stopped at the point, where the amount of the effluent reached 1,000 cc., and was replaced by the feeding of water. As is evident from the graph in FIG. 3, hydrofluoric acid can be almost quantitatively separated from fluosilicic acid. Though a weakly basic anion exchange resin is employed in this example, a strongly basic exchange resin such as Amberlite 1R-400 may likewise be employed for separating hydrofluoric acid from fluosilicic acid, as there is a difference in bonding strength between them. However, it is more advantageous to employ the weakly basic anion exchange resin than to employ the strongly basic anion exchange resin, because a large amount of regenerating agent is required in the case of the strongly basic resin, resulting in a high regeneration cost. As to the ion exchange operation a continuous operation employing two towers alternately is carried out in the present invention, as shown in the flow-sheet of FIG. 1. However, for the purpose of the present invention there may also be employed a batch operation using a single tower as well as any conventional ion exchange technique using a continuous exchange apparatus. In case it is desirable from the point of material balance to raise the concentration of the recovered hydrofluoric acid, it is sometimes preferable to reduce the amount of water for dilution to be mixed by carrying out a conventional continuous ion exchange method.

As already mentioned, anion exchange resin which has separated fluosilicic acid from distillate, can be used again for refining hydrofluoric acid, after it is regenerated. As a regeneration method, the resin which has adsorbed fluosilicic acid may be regenerated to OH-type by being rinsed with an aqueous alkali solution such as NaOH solution. However, the rinsing of fluosilicic acid by NaOH solution is attended with disadvantages that $SiO_2$ is liable to be produced by decomposition of fluosilicic acid, because it is unstable in the relatively high region of the pH value, and when such $SiO_2$ is produced in the fine holes of the ion exchange resin particles the ion exchange power is largely reduced. Of course, even in this case, if a large amount of NaOH solution is used for rinsing, $SiO_2$ is changed to sodium silicate, which is dissolved and washed away. However, this method has a disadvantage of needing a large amount NaOH solution. Therefore, in the present invention a method is adopted of regenerating the resin to the OH-type by means of alkaline solution under conditions that $SiO_2$ could not be produced by replacing fluosilicic acid by sulfuric acid, hydrochloric acid and the like in advance.

In the process of the present invention fluorine ion in the waste acid may be recovered as an aqueous solution of hydrofluoric acid, and water coming out together with the recovered hydrofluoric acid may be used as water for diluting a concentrated sulfuric acid, when reused for pickling silicon steel sheets. Therefore, there is no necessity of specially carrying out the separation of water. Thus, the method of the present invention can be said to be a very rational treating method of the waste acid. Hydrofluoric acid is an acid of high permeability and is very harmful to public life, if discharged as it is without any treatment. However, as hydrofluoric acid is extremely high in price as compared with other acids such as sulfuric acid and the like, it is an operation of high economic value to recover it from waste acid and reuse it for pickling. When the waste acid obtained from pickling silicon steel sheets is treated by the process according to the present invention, not only the operation cost is covered, but also a profit may be obtained.

Example

A waste acid of a following composition was obtained from pickling silicon steel sheets by sulfuric solution containing hydrofluoric acid.

| | Wt. percent |
|---|---|
| $H_2SO_4$ | 23.3 |
| $FeSO_4$ | 7.29 |
| HF | 1.38 |
| $H_2SiF_6$ | 0.584 |
| $H_2O$ | 67.4 |

10 kg. of the thus obtained waste acid was introduced in an evaporator, the inside of which was protected with fluor resin. The evaporator was heated from the outside with an oil bath, and the vapor generated thereby was introduced in a condenser made of fluor resin and condensed therein. Distillate and distillation residue of the following compositions were obtained by this distillation operation:

(1) Distillation residue

Crystal

| | Kg. |
|---|---|
| $FeSO_4 \cdot H_2O$ | 0.795 |

Solution

| | |
|---|---|
| $H_2SO_4$ | 2.33 |
| $FeSO_4$ | 0.0191 |
| HF | 0.00695 |
| $H_2SiF_6$ | 0.00045 |
| $H_2O$ | 1.42 |

(2) Distillate

| | Kg. |
|---|---|
| HF | 0.131 |
| $H_2SiF_6$ | 0.058 |
| $H_2O$ | 5.24 |

The said distillation residue was cooled and filtered under a reduced pressure by means of a Buchner's funnel to the following:

| | Kg. |
|---|---|
| Filtercake (mainly $FeSO_4H_2O$) | 1.37 |
| Filtrate (mainly $H_2SO_4$) | 3.20 |

A column chromatograph apparatus filled with 0.45 l. of a weakly basic ion exchange resin, a commercial Amberlite 1R-45, was regenerated to the OH-type by using 1 N caustic soda solution according to a conventional method and rinsed by water. The said distillate was passed through the said column at a rate of 0.8 to 1.0 liter per hour. Thereupon, the distillate remaining in the apparatus was washed out by passing water at the same rate. Taking away the portions of the effluents obtained at the beginning and end periods of passing the distillate, which were very low in the acid concentration due to the water dilution, only the portion of the middle period, which was high in the acid concentration, was sampled and analyzed. It was proved to be a substantially pure aqueous solution of hydrofluoric acid as shown in the following:

Amount of effluent sampled _____ kg __ 5.70
Composition of effluent HF _____ wt. percent __ 2.26
$H_2SiF_6$ _____ Trace The used column chromatograph apparatus was subjected to the regenerating operation as mentioned below to make it ready for reuse. That is, 2 liters of 2 N aqueous solution of sulfuric acid was passed through the apparatus at a rate of 1.5 liters per hour and thereupon rinsed with water.

Then, 1.5 liters of 1 N caustic soda solution was passed through the column apparatus at a rate of 1.5 liters per hour and subsequently water was passed at substantially the same rate to rinse the column.

5.7 kg. of the aqueous solution of hydrofluoric acid obtained by passing the distillate through the column chromatograph as above mentioned were mixed with 3.20 kg. of the filtrate obtained by filtering the distillation residue to make a mixture, to which further 0.95 kg. of 95% sulfuric acid and 0.12 kg. of 56% hydrofluoric acid were added to prepare 9.75 kg. of a regenerated acid solution ready for pickling silicon steel sheets. The composition of the thus prepared regenerated acid solution was as follows:

| | Wt. percent |
|---|---|
| $H_2SO_4$ | 28.9 |
| $FeSO_4$ | 0.163 |
| HF | 2.03 |
| $H_2SiF_6$ | 0.0038 |
| $H_2O$ | 68.9 |

What is claimed is:

1. A method of treating a waste acid solution resulting from pickling silicon steel sheets with a mixed aqueous solution containing sulfuric acid, ferrous sulfate, hydrofluoric acid and fluosilicic acid, which comprises the steps of (1) distilling the said waste acid solution to evaporate hydrofluoric acid, water, and fluosilicic acid contained in the solution, (2) collecting the resulting distillate of hydrofluoric acid, water and fluosilicic acid by means of cooling, (3) filtrating the nonvolatile residual liquor remaining after said evaporation process to obtain a filter cake consisting predominantly of crystals of ferrous sulfate and a mother liquid mainly composed of sulfuric acid and (4) passing the distillate collected in step (2) above containing hydrofluoric acid and fluosilicic acid through an OH-type anion exchange resin to separate hydrofluoric acid solution from said distillate by causing fluosilicic acid to combine with said resin.

2. A method of treating a waste acid solution resulting from pickling silicon steel sheets, said waste acid comprising a mixture of an aqueous solution containing sulfuric acid, ferrous sulfate, hydrofluoric acid and fluosilicic acid, which method comprises the steps of (1) distilling the said waste acid solution to evaporate hydrofluoric acid, water and fluosilicic acid contained in the solution, (2) collecting the resulting distillate of hydrofluoric acid, fluosilicic acid and water by means of cooling, (3) filtrating the nonvolatile residual liquor remaining after the evaporation procedure of step (2) above to obtain a filter cake consisting mainly of crystals of ferrous sulfate and a mother liquid mainly composed of sulfuric acid, and (4) mixing the mother liquid mainly composed of sulfuric acid obtained by filtration with the hydrofluoric acid solution, obtained by passing the distillate through the anion exchange resin, to prepare a regenerated solution reusable for pickling silicon steel sheets.

3. The method claimed in claim 1, wherein the waste acid solution resulting from pickling silicon steel sheets, which waste liquor comprises a mixture of an aqueous solution containing sulfuric acid, ferrous sulfate, hydrofluoric acid and fluosilicic acid is subjected to an evaporative condensation in such a degree that the concentration of sulfuric acid of the nonvolatile residual liquor is raised up to more than 45%.

4. The method claimed in claim 1, wherein a condensed solution of the distillate containing hydrofluoric acid and fluosilicic acid is passed through a weakly basic anion exchange resin of OH-type column to cause an aqueous solution containing only hydrofluoric acid to flow out at first and when a small amount of fluosilicic acid begins to appear in the effluent, stopping the feeding of said condensed solution so that a solution containing substantially only hydrofluoric acid is obtained.

5. The method claimed in claim 1, wherein fluosilicic acid combined with the anion exchange resin substantially saturated with fluosilicic acid ion is desorbed and washed away by means of an aqueous solution of strong acid and then said resin is converted to an OH-type by using an aqueous solution of NaOH so that the distillate containing hydrofluoric acid and fluosilicic acid is contacted with the regenerated OH-type anion exchange resin.

References Cited

UNITED STATES PATENTS

| | | | |
|---|---|---|---|
| 2,185,095 | 12/1939 | Smith et al. | 23—172 XR |
| 2,296,118 | 9/1942 | Preisman | 23—153 |
| 2,738,322 | 3/1956 | Bauman et al. | |
| 2,975,029 | 3/1961 | Horton et al. | 23—172 |
| 3,205,168 | 9/1965 | Mihara et al. | 23—172 XR |
| 3,306,702 | 2/1967 | Odland et al. | 23—172 XR |

OSCAR R. VERTIZ, *Primary Examiner.*

LEON D. ROSDOL, EDWARD STERN, *Examiners.*

W. E. SCHULZ, *Assistant Examiner.*